United States Patent [19]

Wilson

[11] Patent Number: 4,889,747
[45] Date of Patent: Dec. 26, 1989

[54] HYDROPHOBIC EXPANDED PERLITE COMPOSITIONS AND PROCESS FOR PREPARING THE SAME

[75] Inventor: Michael E. Wilson, Middleburg, Fla.

[73] Assignee: PCR, Inc., Gainesville, Fla.

[21] Appl. No.: 317,714

[22] Filed: Mar. 1, 1989

Related U.S. Application Data

[63] Continuation-in-part of Ser. No. 189,146, May 2, 1988.

[51] Int. Cl.$^4$ .............................................. B05D 7/00
[52] U.S. Cl. ...................................... 427/221; 106/2; 106/287.13; 106/DIG. 2; 252/378 P; 427/387
[58] Field of Search ................ 106/2, 287.13, DIG. 2; 252/378 P; 427/221, 387

[56] References Cited

U.S. PATENT DOCUMENTS

| | | | |
|---|---|---|---|
| 3,772,065 | 11/1973 | Seiler | 117/123 |
| 4,342,796 | 8/1982 | Brown et al. | 427/136 |
| 4,433,013 | 2/1904 | Puhringer | 427/337 |
| 4,517,375 | 5/1985 | Schmidt | 556/463 |
| 4,525,213 | 6/1985 | Linn | 106/2 |
| 4,648,904 | 3/1987 | DePasquale et al. | 106/2 |

*Primary Examiner*—Michael Lusignan
*Attorney, Agent, or Firm*—Hedman, Gibson, Costigan & Hoare

[57] ABSTRACT

Expanded perlite compositions containing thereon, therein or thereon and therein buffered aqueous silane emulsion compositions as well as hydrophobic expanded perlite compositions as described above but from which residual water has been removed are provided. A process for the preparation of the same is also provided.

54 Claims, No Drawings

HYDROPHOBIC EXPANDED PERLITE COMPOSITIONS AND PROCESS FOR PREPARING THE SAME

This application is a continuation-in-part of copending application Ser. No. 07/189,146 filed on May 2, 1988.

FIELD OF THE INVENTION

This invention relates to expanded perlite compositions containing thereon, therein, or thereon and therein buffered aqueous systems which render the expanded perlite water repellent. More particularly, the present invention relates to expanded perlite treated with buffered emulsions of aqueous silanes, and/or oligomers thereof showing improved wet-out of the expanded perlite into organic resins, improved hydrolytic and storage stability, and improved performance as a filter aid even when biocides are included in the emulsions.

BACKGROUND OF THE INVENTION AND PRIOR ART

The utility of expanded perlite as a loose-fill insulation, e.g., block and cavity fillers; aggregates in plaster and wallboard; aggregates in lightweight concrete, e.g., roof decks and prefabricated structural panels; a filtration medium; a soil conditioner; a paint filler; a constituent of oil-well drilling muds and concretes; and inert packing materials is widely known. See Tver and Bolz, *Encyclopedic Dictionary of Industrial Technology, Materials, Processes and Equipment,* Chapman and Hall, 1984, pages 226-227. However, expanded perlite, which is generally formed by the conversion of contained water in crushed perlite into steam by abrupt heating, absorbs moisture readily and is readily dispersible in an aqueous medium. These properties greatly restrict the commercial applications and the uses of expanded perlite.

Porous inorganic substrates, e.g. insulators such as diatomaceous earth brick, electrical insulators, porcelain spark plugs, and various building compositions have been shown to be rendered water repellent by silanes and especially by alkoxysilanes. However, the silane compositions currently utilized for such purposes employ various organic solvents such as alcohol, e.g, Seiler, U.S. Pat. Nos. 3,772,065, and Brown et al., 4,342,796; or hydrocarbons, e.g., Linn, 4,525,213, limiting the production and the use of such water repellent products due to the toxicity, the flammability and the like of the solvents.

Therefore, water repellent porous inorganic substrates produced by treatment with aqueous silane compositions which are of low toxicity and non-flammable have become important. See, Puhringer, U.S. Pat. Nos. 4,433,013; Schmidt, 4,517,375; and DePasquale and Wilson, 4,648,904. Such compositions can have an important drawback, however, and that is that the pH of the aqueous silane component may tend to drift. The silane will then react with water and polymerize. This reduces the hydrophobic properties of the resultant insulation or building component compositions by reducing the content of he active, water-repellent ingredient. Moreover, the pH of the system may shift when additives are included such as a biocide, which is commonly added to retard growth of fungi and the like. Although the stability of the water-containing emulsions can be enhanced to some extent by refrigerating them, or the problem of reduced efficacy can be avoided by using the emulsions soon after preparation, both expedients make production of these water repellent insulation and building component compositions costly and may in some cases actually encourage the use of the toxic and flammable above-mentioned solvent borne, non-aqueous compositions.

Copending application U.S. Ser. No. 07/189,146, filed May 2, 1988, discloses that by selecting appropriate silanes (largely water insoluble) and appropriate emulsifiers, water-based, normally hydrolyzable silane emulsions may be prepared that are hydrolytically stable if the pH is maintained in a predetermined pH stable range, typically 6-8, with a buffering compound, comprising particularly a substance or a combination of substances, which when dissolved in water produces a solution which resists a change in its hydrogen ion concentration upon the addition of acid or alkali, and that these buffered aqueous systems may be used to increase the resistance to penetration by aqueous medium of a porous substrate.

It has now been discovered that expanded perlite can be rendered hydrophobic by treatment with buffered silane emulsions and that the resultant hydrophobic expanded perlite compositions exhibit improved wet-out properties in organic resins, improved hydrolytic and storage stability, improved performance as a filter aid, reduced water absorption and reduced solubility in aqueous media.

SUMMARY OF THE INVENTION

According to the present invention, there are provided expanded perlite compositions comprising (A) from about 20 to about 99.9 parts by weight of expanded perlite; containing thereon, therein, or thereon and therein, (B) from about 0.1 to about 80 parts by weight of the expanded perlite (A) of an additive comprising a buffered aqueous silane emulsion comprising (i) a hydrolyzable silane essentially hydrolytically stable within a determinable pH range; (ii) an emulsifier or mixture of emulsifiers having an HLB value of from about 1.5 to about 20; (iii) an effective amount of at least one compound for buffering the pH of the additive within the determinable pH range; and (iv) water.

Preferred features of the present invention comprise a hydrophobic expanded perlite composition as described above but from which residual water (iv) has been removed and a hydrophobic expanded perlite composition as defined immediately above wherein the residual water (iv) has been removed by heating.

Special mention is made of embodiments of this invention wherein additive (B) also includes an effective amount of (v) a biocide; wherein an insulation composition is comprised of the above defined hydrophobic expanded perlite composition; and wherein a reinforced thermoplastic composition is comprised of a thermoplastic polymer and the above defined hydrophobic expanded perlite composition.

Also contemplated by the present invention is a process for increasing the resistance to penetration by aqueous media of expanded perlite by applying on, in, or on and in from about 20 to about 99.9 parts by weight of expanded perlite from about 0.1 to about 80 parts by weight of the expanded perlite of a buffered aqueous silane emulsion as above defined and allowing the treated expanded perlite to cure.

Special mention is made of embodiments of the process wherein the buffered aqueous silane emulsion also includes an effective amount of (v) a biocide as well and a method for the production of as an insulation composition comprising the hydrophobic expanded perlite as above defined and a thermoplastic composition comprising a thermoplastic polymer and the hydrophobic expanded perlite as above defined.

DETAILED DESCRIPTION OF THE INVENTION

The Expanded Perlite

Perlite generally comprises any glass rock with the capacity to expand greatly on heating and particularly comprises volcanic glass of rhyolitic composition, containing 2 to 5 percent of combined water. Perlite is generally characterized by a system of concentric, spheroidal cracks which are called perlite structure. Expanded perlite denotes any glass rock and more particularly a volcanic glass which has expanded suddenly or "popped" while being heated rapidly. This "popping" generally occurs when the grains of crushed perlite are heated to the temperatures of incipient fusion. The contained water is converted to steam and the crushed particles form light, fluffy, cellular particles. Volume increases of the particles of at least ten fold are common. Different types of perlite are characterized by variations in the composition of the glass affecting properties such as softening point, type and degree of expansion, size of the bubbles and wall thickness between them, and porosity of the product. See generally; *Encyclopedic Dictionary of Industrial Technology, Materials, Processes and Equipment*, (1984) pages 226–227 and Grant; *Hackh's Chemical Dictionary*, The Blakiston Company Inc., 3rd Edition (1944).

The Hydrolyzable Silane (i)

The additive buffered aqueous silane emulsions of the present invention preferably include as component (i) a hydrolyzable silane, for example, one with a molecular weight up to about 600 (or essentially a multiple thereof, if oligomerized) and the general formula of $R_n$—Si—$(R^1)_{4-n}$, wherein R is a $C_1$-$C_{30}$ hydrocarbyl or halogenated hydrocarbyl group, $R^1$ is a $C_1$-$C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the R group. The $R^1$ group can comprise a $C_1$-$C_6$ alkoxy, halogen, amino, or carboxylate group. Thus, among the alkyl groups useful as $R^1$ are methyl, ethyl, n-propyl, and isopropyl. As indicated, n may be 1 or 2 and thus, monohydrocarbyl substituted alkoxysilanes and dihydrocarbyl substituted alkoxysilanes are contemplated by the present invention. The active ingredients of the additive can also comprise condensation dimers and trimers, or other oligomers of the silanes, as are well known in the art. The hydrolyzable silanes (i) can range widely in amount. However, typically the amount can comprise from about 1 to about 60 percent by weight of the additive, and especially from about 10 to about 50 percent by weight.

Silanes especially useful in accordance with the present invention generally have a molecular weight in excess of 135 and preferably greater than 190 up to about 600 for the monomers. The dimers and trimers present in the additive will, of course, have essentially multiples of the molecular weights of the single specie of silane or silanes being used. It should be noted that mixtures of various silanes may be used, if desired.

Specific examples of silanes useful in accordance with the present invention include, but are not limited to, methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-triflurohexyltrimethoxysilane, cyclohexyltrimethoxysilane, benzyltrimethoxysilane, 4-chlorobenzyltriethoxysilane, 4-bromobenzyltri-n-propoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them and the like, alone, and in admixture with dimers, trimers and other oligomers thereof.

The Emulsifiers (ii)

A wide variety of ionic and nonionic emulsifiers have been tried and have been found to be useful in the present invention. Nonionic, anionic, cationic and amphoteric emulsifiers are well known from the state of the art. The preferred emulsifiers are, however, nonionic. The concentration of emulsifier or emulsifiers (ii) used in accordance with the present invention may range widely, but preferably is from about 0.5 to about 50 percent by weight of the silane (i) and especially preferably in the range from about 1 to about 8 percent by weight of the silane.

In general, those emulsifiers or emulsifier blends which have an HLB in the range from about 1.5 to about 20, and preferably in the range from about 4 to about 15 may be used herein. The proper HLB value for a given silane or silane mixture must be determined experimentally in order to ascertain the optimum stability.

The HLB classification of surfactants is based on molecular structure and therefore can be used to predict the behavior of single molecules. HLB is determined experimentally by techniques known to those skilled in this art, for example, those set forth in the pamphlet "The HLB System" published by ICI Americas, Inc., Wilmington, DE., U.S.A. See also the publication "Adjuvants for Herbicides", Weed Society of America, Champaign, IL, U.S.A. If the HLB of an emulsifier is below 1.5, it will not be useful in this invention because it will not produce a stable oil-in-water emulsion. If, on the other hand, the HLB is above 20, it also will not be useful because stability is poor. HLB values in the range of 4–17 are preferred because they provide the most stable emulsions of the above mentioned silanes.

Specific examples of emulsifying agents which may be used in accordance herewith include, but are not limited to the following with the HLB value given in parenthesis following the name: sorbitan trioleate (1.8), sorbitan tristearate (2.1), polyoxyethylene sorbitol hexastearate (2.6), glycerol monostearate (3.8), sorbitan monooleate (4.3), sorbitan monostearate (4.7), polyoxyethylene(2 mol) stearyl ether (4.9), sorbitan monopalmitate (6.7), polyoxypropylene mannitol dioleate (8), polyoxyethylene sorbitol oleate (9.2), polyoxyethylene stearate (9.6), polyoxyethylene sorbitan monooleate (10.0), polyoxyethylene monooleate (11.4), polyoxyethylene(6 mole) tridecyl ether (11.4), polyoxyethylene(10 mole) cetyl ether (12.9), polyoxyethylene sorbitan monooleate (15), polyoxyethylene(20 mole) stearyl ether (15.3), polyoxyethylene(15 mole) tridecyl ether (15.4), polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6; block copolymers of ethylene oxide and propylene oxide having HLB values in the range of 5.5 to 15; ethoxylated octyl phenols having an HLB of about 13.5, 17.3, and 17.9; fatty acid glycerides having HLB value of approximately 4, sodium lauryl sulfate, mixtures of any of the foregoing, and the like.

The preferred emulsifying agents, given in the table below, provide especially useful emulsions of silanes.

TABLE I

| TYPE OF SURFACTANT | EXAMPLES (SUPPLIER; HLB) |
|---|---|
| Polyoxyethylene alcohols | Brij 30 (ICI Americas;9.7) |
| | Tertigol 15-S-3 (Union Carbide; approx. 10) |
| | Triton DF 16 (Rohm & Haas; 11.6) |
| Ethoxylated nonyl phenols | NP-6 (Union Carbide; 11) |
| | NP-7-(Union Carbide; 12) |
| | CO-520 (GAF;10) |
| Dialkyl phenol ethoxylate | DM-530 (Gaf; 10.6) |
| Block copolymers of ethylene oxide and propylene oxide | Pluronics (BASF) |
| | L42 (8), L62 (7), L64 (15) |
| | L72 (6.5), L92 (5.5), 25R2 (6.3) |
| | Tetronic 702 (BASF; 7) |
| Fatty acid glycerides | Arlacel 165 (ICI Americas; 4) |
| Sorbitan fatty acid esters | Spans (ICI Americas) |
| | 20 (8.6), 40 (6.7), 60 (4.7) |
| | 80 (4.3) |
| Polyoxyethylene sorbitan fatty acid esters | Tween 61 (ICI Americas; 9.6) |
| | Tween 81 (ICI Americas; 10.0) |
| | Atlas G-1096 |
| Blends of sorbitan esters with polyoxethylene amines | Atlas G-2090 (ICI Americas) |
| Amphoteric | Atlas G-271 (ICI Americas) |
| Polyvinyl alcohol | (Air Products and Chemicals, Inc.) |
| Blend of octylphenol polyoxyethylene ethanol | Triton X-100 and Triton X-305 (Rohm & Haas, about 15) |

Blending may be necessary, and desirable, if one of the emulsifiers, e.g., sodium lauryl sulfate, has an HLB outside the range of 1.5-20. Sodium lauryl sulfate, HLB about 40, will be blended with a low HLB material, as illustrated above, for use.

Buffering agents (iii)

When used herein and in the appended claims the term "compound for buffering the pH of said composition within said determinable pH stable range" contemplates any substances or combination of substances, which, when dissolved in water produces a solution which resists a change in its hydrogen ion concentration upon the addition of acid or alkali. Agents for buffering the additives within the pH range optimum for silane stability can vary widely in type and amount. The selection of a suitable buffering agent is readily made by techniques well known to those of ordinary skill in this art. Especially convenient is to prepare a silane composition comprising the silane (a), the emulsifier (b), and water (c) in accordance with the teachings of DePasquale and Wilson, U.S. Pat. No. 4,648,904, and to measure the pH and silane concentration initially and then to add the buffering agent candidate. The candidate to be acceptable should maintain the pH level within the said determinable pH range, even when adding substantial quantities of acid or bases, which would ordinarily cause the pH to swing into areas in which substantial silane hydrolysis will occur. Swings of plus or minus one pH unit are tolerable. Also relevant would be a pH swing induced by additions of a biocide that materially alters pH and promotes hydrolysis. Two methods are convenient for measuring long term stability: one is to determine final pH and final silane content, after aging, and the other is to performance test the silane emulsions on mortar cubes using standard test methods, such as those described in the above-mentioned DePasquale and Wilson patent. In the former, using an unsuitable buffering compound will not prevent the pH from swinging into a range promoting hydrolysis, e.g., from 7.5 to 4.0 and the final silane concentration will be materially reduced, e.g., cut from 40 percent to 20 percent and, in extreme cases, all the way down to zero percent. Such a test should be carried out over a significant time period, e.g., after aging the emulsion under test for up to 12 months at room temperature. In the performance test, a 2 inch mortar cube is coated in duplicate with the test emulsion and the coating cured, then immersed in water for 21 days. The percent reduction in weight gain of a compound compared to untreated controls is indicative of the retention of silane content and the efficacy of the buffering agent.

Illustrative of buffering agents useful for silane emulsions, especially those containing biocides are: organic and inorganic acids and bases, including salts thereof, and preferably mono- or poly-alkali metal, alkaline earth metal or amine salts of carbonic acid, phosphoric acid, sulfuric acid, hydrosulfuric acid, a $C_1-C_6$ organo-, mono- or poly-carboxylic acid, or a $C_2-C_{30}$ alkyleneiminopolycarboxylic acid, ammonia, a $C_1-C_{30}$ organic base, or a mixture of any of the foregoing. Illustrative are: sodium bicarbonate, sodium carbonate, ammonium carbonate, sodium borate, mono-, di-, or trisodiu phosphate, mono-, di-, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases, such as the use of ammonium hydroxide and acetic acid together, will also be effective.

Trisodium phosphate ($Na_3PO_4$) and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less that 0.01 percent will not be enough to be useful, and more than 5 percent by weight of the total composition will be uneconomical.

If a biocidal agent (v) is used, any of those well known in the art for imparting antimicrobial and biocidal activity can be used in conventional amounts, e.g., from about 0.1 to about 5 percent by weight based on the additive. Suitable biocidal agents for these embodiments comprise 6-acetoxy-2,4-dimethyl-m-dioxane, sold by Givaudan Corp. under the trademark Giv-Gard DXN biocide, methyl p-methoxy benzoate, and the like. Typical concentrations of these biocides are 0.15 percent by weight.

In addition to biocides, the buffer stabilized additive formulations of this invention may include other additional components such as fragrances, colorants, thickeners, foaming agents, anti-foaming agents, and the like.

The expanded perlite composition of the present invention comprises (A) from about 20 to about 99.9 parts by weight of expanded perlite and (B) from about 0.1 to about 80 parts by weight of expanded perlite (A) of the additive, buffered aqueous silane emulsion. The composition is prepared by any convenient method of mixing the ingredients in conventional equipment.

The expanded perlite composition is cured by removing residual water (iv) resulting in a hydrophobic expanded perlite composition. Preferably, the residual water (iv) is removed by heating. The curing step (b) is carried out at a temperature of from about 50° C. to about 250° C. for from about 0.1 hours to about 350 hours.

The hydrophobic expanded perlite compositions of the present invention can be formulated into, for example, insulation, thermoplastic compositions by combining the hydrophobic expanded perlite with a thermoplastic polymer, for example, polyethylene, polypropylene, nylon, and the like, plastic aggregate, premixed perlite-gypsum plaster, premixed perlite-wallboard, lightweight concrete aggregate, loose-fill insulation such as block and cavity filler, filtration medium, soil conditioner, paint filler, oil-well drilling mud and concrete constituent, inert packing materials, various other building components and the like. The foregoing list is merely illustrative and is not intended to limit the invention in any manner whatsoever.

DESCRIPTION OF THE PREFERRED EMBODIMENTS

The following examples illustrate the present invention but the claims are not to be construed as limited thereto. The following test methods are used to test for hydrophobicity:

(1) Water Drop Test—a sample is placed in an aluminum weighing dish, the surfaces are uniformly pressed to allow a flat surface, several drops of water are placed on the surface and are observed;
(2) Water Solubility Test—approximately 0.5 gm of a sample is placed in a vial containing 2 oz. of water. The vial is shaken and is observed.

PROCEDURE A

To a mixture of 200 grams of octyltriethoxysilane and 8 grams of an emulsifier mixture comprising 70 percent of octylphenol polyethyleneoxyethanol (Rohm & Haas Triton® X-100) and 30 percent of octylphenol polyethyleneoxyethanol (Rohm & Haas Triton® X-305) HLB of about 15, in a Waring Blendor® mixer is slowly added 292 grams of deionized water which contains 6-acetoxy-2,4-dimethyl-m-dioxane biocide (Givaudan Corp. GIV-GARD® DXN biocide) in an amount to provide 0.15 percent ultimate concentration; and 0.10 percent sodium bicarbonate as a buffering agent. Mixer speed is gradually increased to provide good dispersion without incorporating a large amount of air. After complete addition, the mixture is stirred at high speed for an additional five minutes to provide a buffered emulsion in accordance with this invention, having a pH of 7.5, and which maintains its homogeneous, milky appearance for up to a year or more at room temperature.

EXAMPLE 1

2.50 grams of the emulsion of Procedure A (40 wt % emulsion of n-octyltriethoxysilane, PROSIL® 9234, PCR, Inc.) is added to 30 ml of deionized water and allowed to mix for 30 minutes. 100 grams of expanded perlite (filter aid grade 279, Silbrico, Inc.) is charged in a 2 quart Patterson-Kelly twin shell mixer. The mixed emulsion solution is slowly added over a period of 2 minutes to the expanded perlite in the twin shell while mixing. Mixing is continued for 10 minutes to apply the emulsion solution to the expanded perlite. The treated expanded perlite is removed from the twin shell, is placed in an aluminum pan, and is dried in a forced air oven for 2 hours at 100° C. to remove the residual water. The treated expanded perlite is tested for hydrophobicity. Water drops remain on the surface of the treated expanded perlite for longer than 30 minutes in the water drop test. In the water solubility test, the mixture begins to separate 10 to 15 minutes after mixing. After one minute, the treated expanded perlite forms a layer on top of the water, and the water layer is clear with no evidence of suspended particles.

COMPARATIVE EXAMPLE 1

Untreated expanded perlite is tested for hydrophobicity. Water drops are immediately absorbed into the expanded perlite in the water drop test. In the water solubility test, the mixture becomes milky white and remains cloudy for greater than one hour after mixing.

Example 1 and Comparative Example 1 demonstrate the hydrophobic properties imparted to expanded perlite treated according to the present invention with an aqueous emulsion of an alkyltrialkoxysilane. These dramatic alterations of absorption and solubility properties make the hydrophobic expanded perlite of the present invention suitable for a variety of applications.

The above-mentioned patents, publications and test methods are incorporated herein by reference.

Many variations of the invention will suggest themselves to those skilled in this art in light of the above, detailed description. For example, the silane can comprise isobutyltrimethoxysilane, octadecyltriethoxysilane, 4R-triethoxysilylmenthene-1, mixtures thereof, and the like. Instead of 40 percent by weight, the additive can comprise 20 percent by weight of silane. The biocide can be omitted. All such obvious variations are within the full intended scope of the appended claims.

I claim:

1. An expanded perlite composition comprising
   (A) from about 20 to about 99.9 parts by weight of expanded perlite; and, containing thereon, therein, or thereon and therein,
   (B) from about 0.1 to about 80 parts by weight of the expanded perlite (A) of an additive comprising a buffered aqueous silane emulsion comprising effective amounts of
     (i) a hydrolyzable silane essentially hydrolytically stable within a determinable pH range;

(ii) an emulsifier or mixture of emulsifiers having an HLB value of from about 1.5 to about 20;
(iii) an effective amount of at least one compound for buffering the pH of said additive within said determinable pH range; and
(iv) water.

2. A hydrophobic expanded perlite composition as defined in claim 1 from which residual water (iv) has been removed.

3. A composition as defined in claim 2 from which residual water (iv) has been removed by heating.

4. A composition as defined in claim 1 wherein said hydrolyzable silane (i) comprises from about 1 to about 60 percent by weight of the additive; said emulsifier (ii) comprises from about 0.5 to about 50 percent by weight based on (i); said compound for buffering (iii) comprises from about 0.01 to about 5 percent by weight based on (i), (ii), (iii) and (iv) combined; and water (iv) is present in an amount sufficient to provide 100 percent by weight.

5. A composition as defined in claim 1 wherein said hydrolyzable silane (i) has a molecular weight of up to about 600 and comprises a compound of the general formula

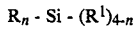
$$R_n - Si - (R^1)_{4-n}$$

wherein R is $C_1$–$C_{30}$ hydrocarbyl or halogenated hydrocarbyl, $R^1$ is $C_1$–$C_6$ alkoxy, halide, amino carboxyl or a mixture of any of the foregoing and n is 1 or 2, or an oligomer of said compound.

6. A composition as defined in claim 5 wherein said silane (i) comprises an alkylalkoxysilane.

7. A composition as defined in claim 6 wherein said silane (i) comprises an alkyltri-alkoxysilane.

8. A composition as defined in claim 7 wherein said silane (i) is selected from the group consisting of isobutyltrimethoxysilane, octadecyltriethoxysilane, 4R-triethoxysilylmethene-1, or a combination of any of the foregoing.

9. A composition as defined in claim 1 wherein said silane (i) comprises octyltriethoxysilane.

10. A composition as defined in claim 5 wherein R comprises a $C_1$–$C_{10}$ alkyl group, $R^1$ comprises a $C_1$–$C_3$ alkoxy group and n is 1.

11. A composition as defined in claim 5 wherein R comprises a $C_4$–$C_{10}$ alkyl group.

12. A composition as defined in claim 4 wherein the concentration of said silane (i) comprises from about 10 to about 50 percent by weight of said additive.

13. A composition as defined in claim 1 wherein said emulsifier (ii) has an HLB value of from about 4 to about 17.

14. A composition as defined in claim 1 wherein said emulsifier (ii) comprises at least one nonionic emulsifying agent.

15. A composition as defined in claim 14 wherein said emulsifier (ii) comprises at least one alkylphenol polyethyleneoxyethanol.

16. A composition as defined in claim 15 wherein said emulsifier (ii) comprises at least one octylphenol polyethylenexyethanol.

17. A composition as defined in claim 14 wherein said emulsifier (ii) comprises a nonionic polyhydroxy compound.

18. A composition as defined in claim 1 wherein said emulsifier (ii) comprises a sorbitan fatty acid ester.

19. A composition as defined in claim 18 wherein said emulsifier (ii) comprises a polyoxyethylene sorbitan fatty acid ester.

20. A composition as defined in claim 4 wherein the concentration of said emulsifier (ii) comprises from about 1 to about 8 percent by weight based on silane (i).

21. A composition as defined in claim 1 wherein said compound for buffering (iii) comprises a mono- or poly-alkali metal, alkaline earth metal or amine salt of carbonic acid, phosphoric acid, sulfuric acid, hydrosulfuric acid, a $C_1$–$C_6$ organo-, mono- or poly carboxylic acid, or a $C_0$hd 2–$C_{30}$ alkyleneiminopoly carboxylic acid, ammonia, a $C_1$–$C_{30}$ organic base, or a mixture of any of the foregoing.

22. A composition as defined in claim 21 wherein said compound for buffering (iii) comprises an alkali metal carbonate or -bicarbonate, or -phosphate or ammonia.

23. A composition as defined in claim 22 wherein said compound for buffering (iii) comprises sodium bicarbonate.

24. A composition as defined in claim 1 wherein the said buffering compound (iii) provides a pH in the range of from about 6 to about 8.

25. A composition as defined in claim 24 wherein said buffering compound (iii) provides a pH of about 7.5.

26. A composition as defined in claim 1 wherein said additive also includes
(v) a small, effective amount of a biocide.

27. An insulation composition comprising a hydrophobic expanded perlite composition as defined in claim 3.

28. A reinforced thermoplastic composition comprising a thermoplastic polymer and a hydrophobic expanded perlite composition as defined in claim 3.

29. A process for increasing the resistance to penetration by aqueous media of expanded perlite, said process comprising
(a) applying on, in, or on and in from about 20 to about 99.9 parts by weight of expanded perlite, a buffered aqueous silane emulsion composition in an amount of from about 0.1 to about 80 parts by weight of said expanded perlite, comprising effective amounts of
(i) a hydrolyzable silane essentially hydrolytically stable within a determinable pH range;
(ii) an emulsifier or mixture of emulsifiers having an HLB value of from about 1.5 to about 20;
(iii) an effective amount of at least one compound for buffering the pH of said composition within said determinable pH stable range; and
(iv) water; and
(b) allowing said treated expanded perlite to cure.

30. A process as defined in claim 29 wherein said hydrolyzable silane (i) comprises from about 1 to about 60 percent by weight of the additive; said emulsifier (ii) comprises from about 0.5 to about 50 percent by weight based on (i); said compound for buffering (iii) comprises from about 0.01 to about 5 percent by weight based on (i), (ii), (iii) and (iv) combined; and water (iv) in an amount sufficient to provide 100 percent by weight.

31. A process as defined in claim 29 wherein said hydrolyzable silane has a molecular weight of up to about 600 and comprises a compound of the general formula

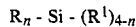
$$R_n - Si - (R^1)_{4-n}$$

wherein R is $C_1$–$C_{30}$ hydrocarbyl or halogenated hydrocarbyl group, $R^1$ is $C_1$–$C_6$ alkoxy, halide, amino, carboxyl or a mixture of any of the foregoing and n is 1 or 2, or an oligomer of said compound.

32. A process as defined in claim 31 wherein said hydrolyzable silane comprises an alkylalkoxysilane.

33. A process as defined in claim 31 wherein said hydrolyzable silane comprises an alkyltrialkoxysilane.

34. A process as defined in claim 33 wherein said hydrolyzable silane (i) is selected from the group consisting of isobutyltrimethoxysilane, octadecyltriethoxysilane, 4R-triethoxysilylmethene-1, or a combination of any of the foregoing.

35. A process as defined in claim 31 wherein said hydrolyzable silane comprises octyltriethoxysilane.

36. A process as defined in claim 31 wherein said hydrolyzable silane comprises a $C_1$–$C_{10}$ alkyl group, $R^1$ comprises a $C_1$–$C_3$ alkoxy group and n is 1.

37. A process as defined in claim 31 wherein said hydrolyzable silane comprises a $C_4$–$C_{10}$ alkyl group.

38. A process as defined in claim 29 wherein the concentration of said hydrolyzable silane comprises from about 10 to about 50 percent by weight of said buffered aqueous silane emulsion composition.

39. A process as defined in claim 29 wherein said emulsifier (ii) has an HLB value of from about 4 to about 17.

40. A process as defined in claim 29 wherein said emulsifier (ii) comprises at least one nonionic emulsifying agent.

41. A process as defined in claim 29 wherein said emulsifier (ii) comprises at least one alkylphenol polyethyleneoxyethanol.

42. A process as defined in claim 29 wherein said emulsifier (ii) comprises at least one octylphenol polyethyleneoxyethanol.

43. A process as defined in claim 40 wherein said emulsifier (ii) comprise a nonionic polyhydroxy compound.

44. A process as defined in claim 29 wherein said emulsifier (ii) comprises a sorbitan fatty acid ester.

45. A process as defined in claim 44 wherein said emulsifier (ii) comprises a polyoxyethylene sorbitan fatty acid ester.

46. A process as defined in claim 29 wherein said emulsifier (ii) comprises from about 1 to about 8 percent by weight based on silane (i).

47. A process as defined in claim 29 wherein said compound for buffering (iii) comprises a mono- or polyalkali metal, alkaline earth metal or amine salt of carbonic acid, phosphoric acid, sulfuric acid, hydrosulfuric acid, a $C_1$–$C_6$ organo-, mono-, or poly-carboxylic acid, or a $C_2$–$C_{30}$ alkyleneiminopolycarboxylic acid, ammonia, a $C_1$–$C_{30}$ organic base, or a mixture of any of the foregoing.

48. A process as defined in claim 29 wherein said compound for buffering (iii) comprises an alkali metal carbonate or -bicarbonate, or -phosphate, or ammonia.

49. A process as defined in claim 29 wherein said compound for buffering (iii) comprises sodium bicarbonate.

50. A process as defined in claim 29 wherein said compound for buffering (iii) provides pH in the range of from about 6 to about 8.

51. A process as defined in claim 29 wherein said compound for buffering (iii) provides a pH of about 7.5.

52. A process as defined in claim 29 wherein said buffered aqueous silane emulsion composition includes
 (iv) a small, effective amount of a biocide.

53. A process as defined in claim 29 wherein curing step (b) is carried out at a temperature of from about 50° to about 250° C. for from about 0.1 hour to about 350 hours.

54. A process for preparing a reinforced thermoplastic composition comprising adding the resultant composition of claim 29 to a thermoplastic polymer.

* * * * *